United States Patent [19]

Manzini, deceased et al.

[11] 4,128,249

[45] Dec. 5, 1978

[54] SEAL FOR A VARIABLE RATIO HYDRAULIC MASTER CYLINDER

[75] Inventors: Ferruccio Manzini, deceased, late of Crema, Italy, by Laura C. Manzini, administratrix, Turin, Italy

[73] Assignee: Benditalia S.p.A., Crema, Italy

[21] Appl. No.: 760,602

[22] Filed: Jan. 19, 1977

[30] Foreign Application Priority Data

Jan. 21, 1976 [IT] Italy .............................. 19426 A/76

[51] Int. Cl.[2] ......................... B65D 53/02; F16J 15/46

[52] U.S. Cl. .................................... 277/182; 277/189; 277/197; 60/588; 92/165 R; 403/328

[58] Field of Search ............... 277/182, 166, 189, 197, 277/206 R, 116.6; 92/128, 165 R; 60/588; 403/326, 328, DIG. 6

[56] References Cited

U.S. PATENT DOCUMENTS

| | | | |
|---|---|---|---|
| 1,635,144 | 7/1927 | Stevens | 403/328 |
| 3,044,813 | 7/1962 | Affeldt | 403/328 |
| 3,439,944 | 4/1969 | Leutenegger | 403/326 |
| 3,490,341 | 1/1970 | Sessody | 92/165 R |
| 3,920,253 | 11/1975 | Bauer | 277/189 |

*Primary Examiner*—Herbert F. Ross

*Attorney, Agent, or Firm*—Leo H. McCormick, Jr.; Ken C. Decker

[57] ABSTRACT

A sealing device is mounted in the bore of a housing in which a piston is slidably mounted. A fluid tight seal is mounted between a shoulder of the housing and a washer circumscribing the piston. The washer has an outer diameter substantially equal to that of the bore and comprises an outer annular groove in which at least one fixing element is disposed. Each fixing element comprises a tongue-shaped portion penetrating through a corresponding radial bore defined at the bottom of the annular groove. When the piston is inserted through the washer, the fixing elements are moved radially towards the outside of the washer through the tongue-shaped portions and penetrate into a facing annular groove formed in the bore.

7 Claims, 3 Drawing Figures

8 14 30 A 34 38 20 10 36 16 12 22 26 A 32 18

10
20
38
34
A
A
18
32
36
16
26
30
22
14
12
8

24
34
B
O
C
32

26
32
24
28
22

SEAL FOR A VARIABLE RATIO HYDRAULIC MASTER CYLINDER

BACKGROUND OF THE INVENTION

The present invention essentially relates to a sealing device between a casing in which there is a bore and a piston displaceable inside the said bore.

It is known, particularly from French Pat. No. 2,026,459, to dispose a fluid-tight seal in a groove provided on the inside of the casing. However, the said structure has disadvantages, particularly if the groove intended to accommodate the seal is disposed in alignment with the end of the bore, since production of the groove and insertion of the seal are very delicate operations. It can be seen from FIG. 1 of the above-mentioned patent that the groove is made in a cover fixed to the main part of the casing, which therefore entails a higher prime cost.

In order to avoid having to construct the casing in a plurality of parts, the present invention proposes a novel type of structure which permits an easier assembly of the seal in its bore whatever may be the relative position of the seal within the bore.

SUMMARY OF THE INVENTION

More particularly, the present invention relates to a sealing-tight device between a casing in which there is a bore, and a piston which moves inside the said bore. The device comprising a seal fixed to the casing and being characterised in that the bore has a shoulder and a groove. The seal is mounted between the shoulder and a washer. The outside diameter of the washer is virtually equal to the diameter of the bore, and an inside diameter of the washer is virtually equal to the diameter of the piston. The washer is held inside the bore after introduction of the piston transversely of the washer by the action of at least one fixing element. The fixing or retaining element has a peripheral portion capable of being inserted into the groove. The peripheral portion of the fixing or retaining element retracts in a corresponding groove on the peripheral surface of the washer, prior to introduction of the piston into the casing.

DETAILED DESCRIPTION OF THE DRAWINGS

The present invention may be the better understood from a reading of the ensuing description, in which reference is made to the appended drawings, in which.

DETAILED DESCRIPTION OF THE INVENTION

Figures 1, 2, 3:
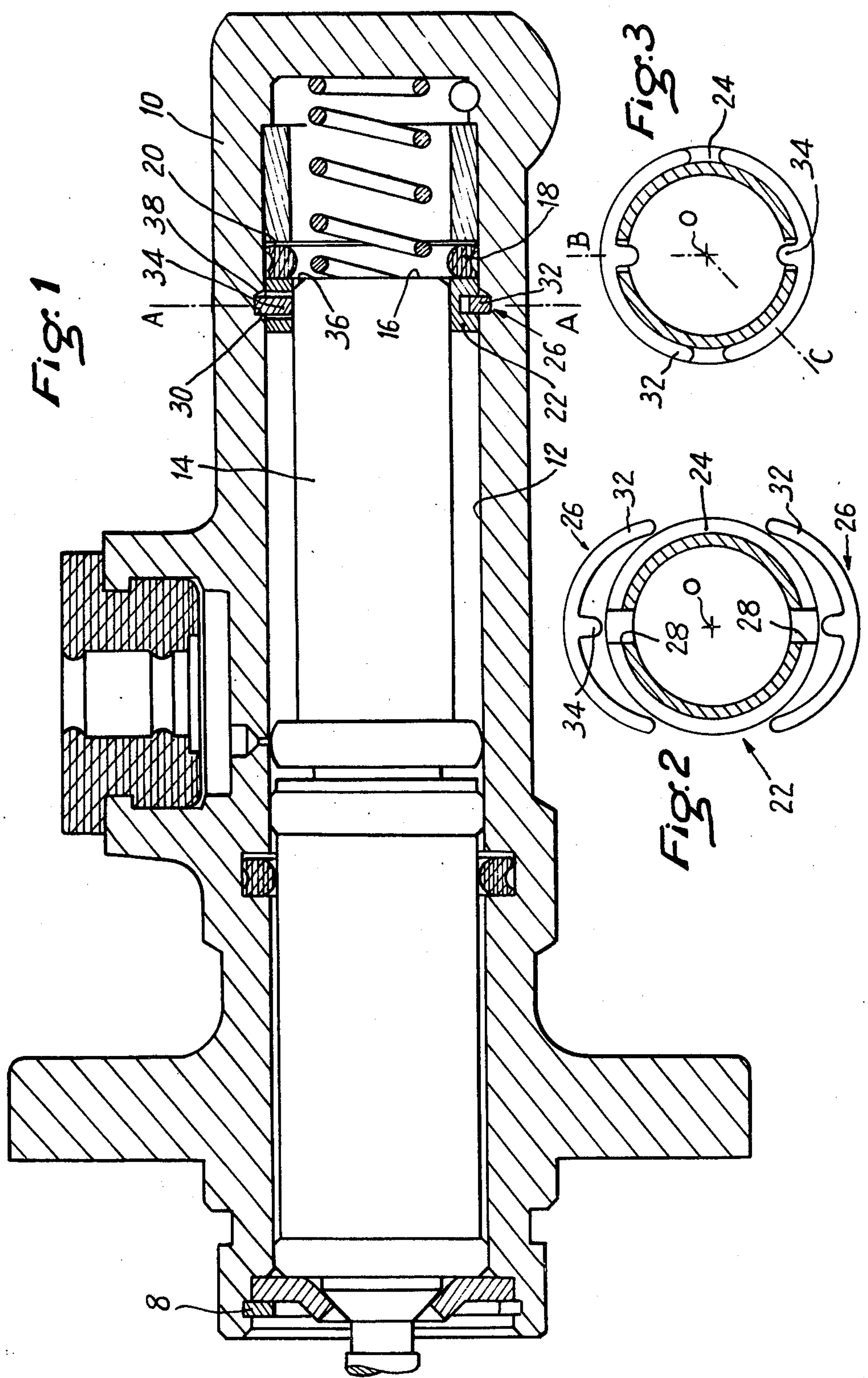
FIG. 1 is a longitudinal sectional view through a braking master cylinder provided with a sealing device according to the present invention.
FIG. 2 is a partly broken away view showing a partial section through the washer and showing the fixing elements which are used in the sealing device illustrated in FIG. 1.
FIG. 3 is a view of the washer with fixing elements illustrated in their inserted position, prior to fitment of the partial assemblies into the casing of the master cylinder.

The master cylinder shown diagrammatically in FIG. 1 is of the type described in French Pat. No. 2,026,459, to which reference may be made in order to know all the details of the structure which are not related in the present description. The master cylinder is of the progressive action type, in other words it has a first phase of emergence, of relatively slow pressure, followed by a second phase of emergence, of much more powerful pressure. In view of this fact, the piston is of the stepped type and its frontal surface co-operates with an annular seal disposed in the vicinity of the closed end of the main bore in the master cylinder. The present invention relates more particularly to assembly of the fluid-tight seal inside the casing of the master cylinder.

The casing 10 has a blind bore 12 in which a stepped piston 14 is slideably mounted. The frontal surface 16 of the piston 14 is adapted to co-operate with the annular rubber seal 18. The seal 18, which is adapted to undergo radial compression, is mounted with a certain clearance between a shoulder 20 made in the casing 10, and a washer 22 mounted on the casing as follows. The washer 22 shown in FIGS. 2 and 3 according to a cross-section taken on the line A—A in FIG. 1, has on one side a peripheral groove 24 intended to serve as a seating for fixing elements 26 and radial bores 28 which emerge in the groove 24. The bore 12 has an annular groove 30 in which it is possible to insert the peripheral portion of each of the fixing elements. As can be seen from FIGS. 2 and 3, the fixing elements have a crown-shaped peripheral part 32 and an inner tongue-shaped part 34 adapted to penetrate the bores 28.

As shown in FIG. 1, the outside diameter of the washer 22 is virtually equal to the diameter of the bore 12, while the inside diameter of the washer 22 is virtually equal to the diameter of the frontal face 16 of the piston 14. On the other hand, the depth of the groove 24 is equal to the radial dimension of the peripheral portions 32 of the elements 26 (see FIG. 3). Furthermore, when the elements 26 are fully inserted into the respective housings constituted in the present case of the groove 24, the tongues 34 penetrate the inside of the washer 22 so that they can come in contact with the piston 14. Finally, as can be seen in FIG. 1, the radial dimension of the portions 32 is virtually double the depth of the groove 30 provided in the casing, while the radial dimension of the tongue 34 is virtually equal to the radial dimension of the washer 22, plus the depth of the groove 30.

The sealing-tight device according to the present invention is fitted as follows. After the seal 18 is inserted into the bore 12, the washer 22 with two fixing elements 26 disposed in the relative inserted or retracted positions as illustrated in FIG. 3, is inserted until it reaches a position in line with the groove 30. Next, the piston 14 is inserted and under the action of the frontal surface 16 in contact with the tongues 34, the fixing elements 26 are moved radially towards the outside of the washer, so that they occupy the respective positions shown in FIG. 1. Certainly, the position of rest of the piston 14, defined by the presence of a stop 8, prevents dismantling of the seal during normal operation of the master cylinder. However, if for any reason it is desired to replace the seal 18, its removal is extremely simple, because it is sufficient merely to draw back the piston 14. In order the better to illustrate the position of the fixing elements after fitment of the master cylinder, the upper part of FIG. 1 shows a cross-section through the fixing element taken on the line 0–B in FIG. 3, while the bottom part of FIG. 1 shows a cross-section through the fixing element taken on the line 0–C in FIG. 3.

In order to facilitate fitment of the seal according to the present invention, chamfers 36 and 38 are provided on the one hand between the front surface 16 of the piston and the tongue 34 of the fixing elements and on the other hand between the periphery 32 of the fixing elements and the groove 30 in the bore. In particular, the groove 30 has its chamfer 38 on the side contiguous with the shoulder 20.

In the particular embodiment according to the present invention described here, two fixing elements are shown in diametrically opposed positions on the washer; however, without going beyond the scope of the present invention, the number of tongue-like projections and the form of the peripheral part of the fixing element, the form of the seating adapted to receive this peripheral part in order to allow withdrawal of the fixing element within the washer at the moment of fitment, may be modified at the will of the user. Likewise, the present invention must not be regarded as being confined to its application to a braking master cylinder of the type with a stepped piston, as described in French Pat. No. 2,026,459.

I claim:

1. A fluid tight assembly comprising a casing provided with a bore and a piston which is adapted for movement inside the bore, said bore having a shoulder formed therein, and a fluid tight annular seal and an annular washer supported by the piston, said seal being disposed between the shoulder and washer, said washer having an outside diameter substantially equal to that of the bore and an inside diameter substantially equal to that of the piston, said bore having a first annular groove, said washer also having a second annular groove on its periphery with at least one radial bore at the bottom of said groove, said first and second grooves being aligned with each other, at least one retainer capable of being disposed in both said first and second annular grooves, said retainer having a curved portion with a radial width greater than the depth of the first groove in the bore and substantially equal to the depth of the second groove in the washer, said retaining element having a tongue inwardly projecting from said curved portion through said at least one radial bore of the washer, said curved portion of the retaining element being urged into said first annular groove due to radial outward movement of the tongue caused by engagement of the outer surface of the piston with the tongue upon movement of the piston through the washer for holding said washer stationary within said casing.

2. A fluid tight assembly as claimed in claim 1, wherein the first and second annular grooves have substantially equal axial lengths, which is substantially equal to the axial width of the retaining element.

3. A fluid tight assembly as claimed in claim 1, wherein the curved portion of the retaining element has a crown-shaped shape with a radial dimension substantially equal to twice the depth of the groove in the bore.

4. A fluid tight assembly as claimed in claim 1, wherein the retaining element has two portions which are disposed in diametrically opposed positions on the washer.

5. A fluid tight assembly as claimed in claim 1, wherein to facilitate movement of the piston through the washer when the seal is fitted, a chamfer is provided between the frontal surface of the piston and the tongue.

6. A fluid tight assembly as claimed in claim 1, wherein a chamfer is provided between the groove in the bore and the peripheral part of the retaining element in order to facilitate its insertion into the groove in the bore when the seal is fitted.

7. A fluid tight assembly as claimed in claim 6, wherein a chamfer is provided on the groove in the bore, particularly on the wall of the said groove which is contiguous with the seal.

* * * * *